(12) United States Patent
Noda et al.

(10) Patent No.: US 6,320,679 B1
(45) Date of Patent: Nov. 20, 2001

(54) IMAGE READER

(75) Inventors: Atsushi Noda, Takatsuki; Haruyuki Koizumi, Yokohama; Atsuo Nishijima; Yuji Ohtsuka, both of Shizuoka, all of (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 08/745,307

(22) Filed: Nov. 12, 1996

Related U.S. Application Data

(63) Continuation of application No. 08/437,226, filed on May 8, 1995, now abandoned, which is a continuation of application No. 07/741,356, filed on Aug. 7, 1991, now Pat. No. 5,434,680.

(30) Foreign Application Priority Data

Aug. 8, 1990 (JP) .................................................. 2-209679

(51) Int. Cl.[7] ............................... H04N 1/024; H04N 1/04
(52) U.S. Cl. ............................................ 358/473; 358/474
(58) Field of Search .................................... 358/473, 474, 358/475, 496, 498, 471; 382/313, 312; 399/211

(56) References Cited

U.S. PATENT DOCUMENTS

| | | | |
|---|---|---|---|
| 4,422,100 | 12/1983 | Duvall et al. | 358/497 |
| 4,893,189 | 1/1990 | Kabota et al. | 358/471 |
| 5,023,922 | 6/1991 | Abramovitz et al. | 382/313 |
| 5,175,422 | 12/1992 | Koizumi et al. | 235/472 |

*Primary Examiner*—Cheukfan Lee
(74) *Attorney, Agent, or Firm*—Dickstein Shapiro Morin & Oshinsky LLP

(57) ABSTRACT

An image scanner of a document incorporated a transparent member on a lower surface for passing reading and reflecting light while preventing entry of dust and foreign matter into the scanner housing. The transparent member is disposed so that at least the area which passes reflected light is located outside of the depth of field of the scanner optical system.

2 Claims, 2 Drawing Sheets

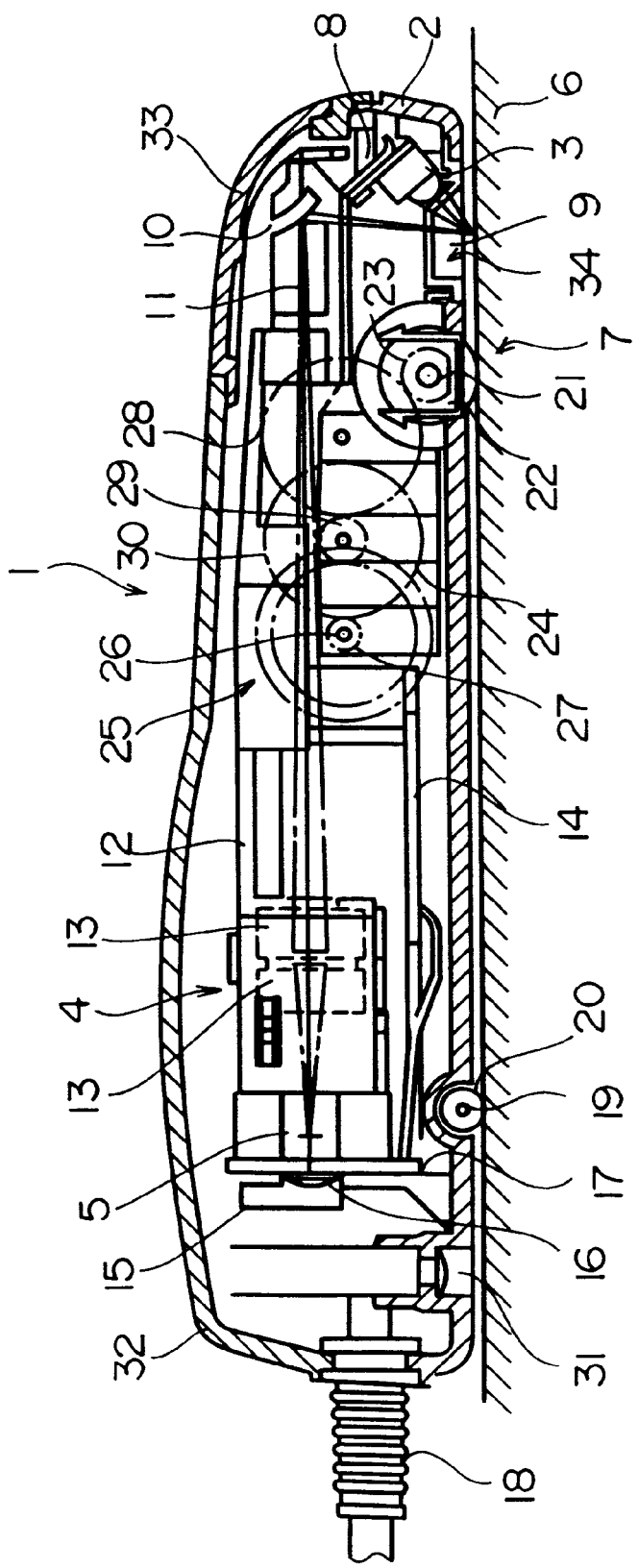

IMAGE READER

This application is a continuation of application Ser. No. 08/437,226, filed May 8, 1995 (abandoned), which is a continuation application of Ser. No. 07/741,356, filed Aug. 7, 1991, which issued as U.S. Pat. No. 5,434,680 on Jul. 18, 1995.

FIELD OF THE INVENTION

The present invention relates to an image scanner and more particularly to an image scanner using a line sensor as a light-receiving means.

BACKGROUND OF THE INVENTION

As an example of the conventional image scanner, a handy scanner 1 employing a condenser system is shown in FIG. 3. This scanner includes a lower casing 2 containing, in the order from right to left in the view, an LED 3 as light-emitting means, a condenser system 4 and a line sensor (PD) 5 as light-receiving means. Disposed close to one end of the lower casing 2 is a roller 7 as a sensor means for detecting the relative amount of movement between the reading position of the PD 5 and the image on a document 6.

The LED 3 is attached to the lower casing 2 with a holder 8 and the light emitted from the LED 3 passes through an aperture 9 formed in the lower casing 2 and is incident on the upper surface of the document 6. The reflected light from the document 6 is reflected by a mirror 10 secured to said holder 8 and guided to the condenser system 4 through a light path 11. The condenser system 4 is composed of a plurality of lenses 13 supported by a holder 12 which is rigidly secured to a first base plate 14 disposed in parallel with the lower casing 2.

The lower casing 2 is provided with a holder plate 15 making an angle of 90° therewith and a second base plate 17 and the PD 5 are fixedly secured to the holder plate 15 by means of a screw 16. The light guided through the light path 11 is focused on the PD 5, where it is converted to an electric signal by the photoelectric transducer, and the resulting signal is fed to a reader device not shown through a cable 18. Rotatably mounted on the underside of the lower casing 2 in the vicinity of PD 5 through a shaft 19 is an auxiliary roller 20.

On the other hand, a supporting shaft 21 for a sensor roller 7 is rotatably supported by a bearing 22 disposed on the lower casing 2 and a drive gear 23 is rigidly mounted in concentric relation with the roller 7. The lower casing 2 is further provided with an encoder 25 through a supporting member 24 and a driven gear 27 is concentrically mounted on a shaft 26 of the encoder 25. The driven gear 27 is driven by the drive gear 23 via the train of gears 28, 29 and 30 and as the scanner 1 is driven in pressure contact with the document 6, the encoder 25 detects the reading position.

Dismountably attached to the lower casing 2 by a screw 31 is an upper casing 32 which covers the various component parts mentioned above. Furthermore, the upper casing 32 is provided with a window 33, which can be freely opened and closed, at one end close to the LED 3. This window 33 is made of a light-transparent material so that the reading position can be ascertained from above.

In the scanner 1 having the above construction, entry of dust or other foreign matter may adversely affect its electrical system to cause a trouble or failure. Moreover, deposition of dust on the mirror 10, condenser system 4 or PD 5 would cause local darkening to interfere with proper image reading. Therefore, the lower casing 2 and the upper casing 32 are hermetically sealed together and a transparent member 34 is tightly fitted across an aperture 9 through which the reading light from the LED 3 is projected on the document 6.

However, the conventional image scanner described above has the following disadvantages. Thus, since the transparent member 34 is located close to the document 6, the entry of dust in the scanner 1 may result in deposition of the dust on the inner surface of the transparent member 34. If the deposit of dust occurs within the depth of field of the lens 13, the resulting shadow of the dust interferes with correct image reading. Moreover, since this deposit of dust occurs in a position closer to the document as compared with the deposit of dust on the other members disposed in the light path, such as the mirror 10, condenser system 4 and PD 5, it exerts a well-magnified influence.

The image scanner of the present invention has been developed to overcome the above disadvantages.

It is an object of the invention to provide an image scanner which insures accurate reading of an image without interferences of dust that may deposit on the transparent member.

Other objects and advantages of the invention will become apparent from the following description and accompanying drawings.

SUMMARY OF THE INVENTION

The present invention is, therefore, directed to an image scanner comprising a light-emitting means for projecting light on a document, a light-receiving means for receiving reflected light from said document to read an image thereon, an optical system for focusing said reflected light on said light-receiving means, a sensor means for detecting a relative amount of movement between the reading position of said light receiving means and the position of the image on said document and a housing accommodating said respective means, wherein said housing is provided with a transparent member for guiding said reflected light to said light-receiving means, said transparent member being disposed sufficiently apart from the surface of said document in such a manner that at least its area transmitting the reflected light is located outside of the depth of field.

In accordance with the invention, wherein the transparent member is located away from the depth of field, dust which may deposit on the transparent member will not cast a large shadow on the image-receiving means so that the dimming of the projected image on the light-receiving means is precluded, thus insuring correct image reading.

BRIEF DESCRIPTION OF THE DRAWINGS

FIG. 3 is a longitudinal section view of a conventional scanner.

DESCRIPTION OF THE PREFERRED EMBODIMENT

Figure 1:
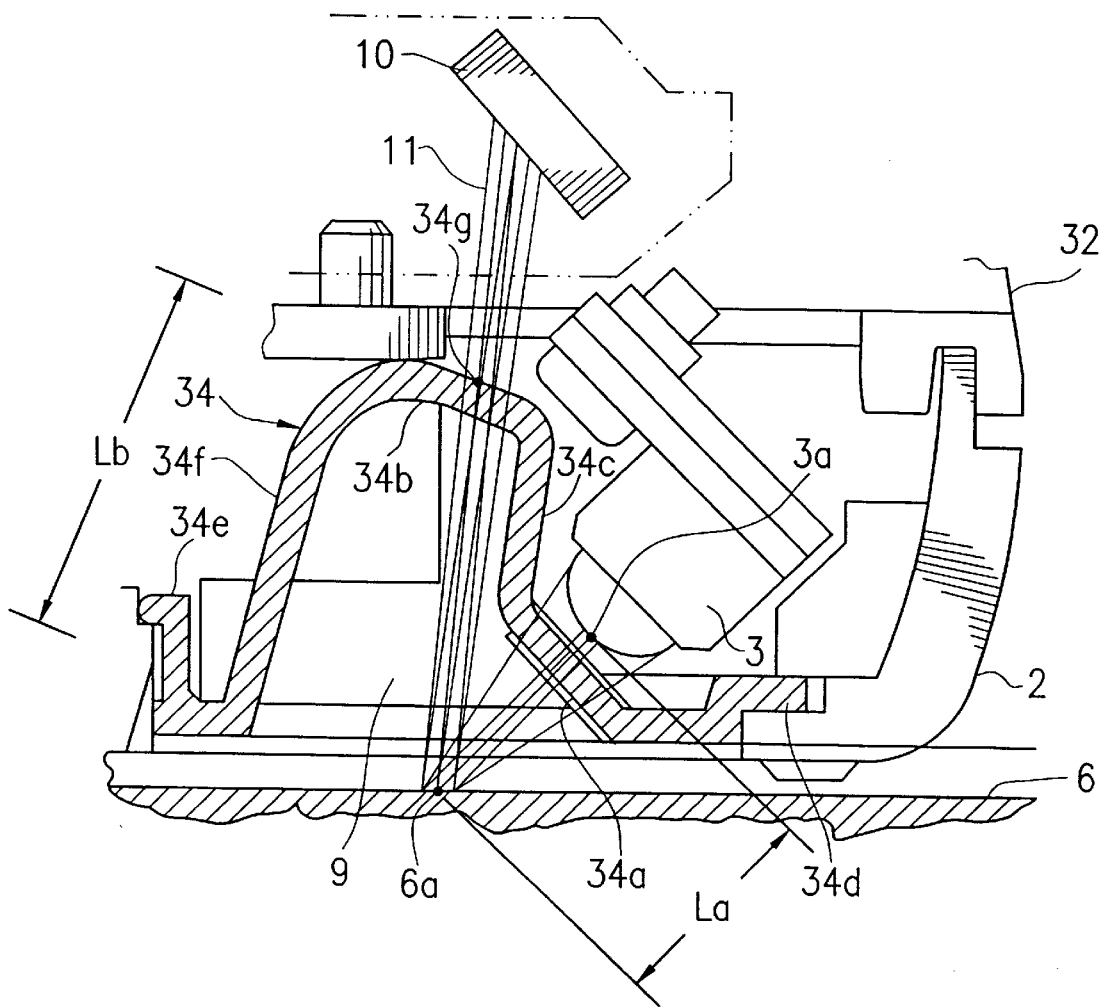
FIG. 1 is a longitudinal section view showing the cardinal part of an image scanner embodying the principles of the invention.

Referring to FIG. 1 which illustrates an image scanner embodying the principles of the invention, all the parts like the corresponding parts of the prior art scanner shown in FIG. 3 are indicated by the like reference numerals and no further description is made.

This embodiment is characterized by the configuration of the transparent member 34 disposed across the aperture 9 of the lower casing 2 and the remainder of the construction is similar to that of the prior art device of FIG. 3. As illustrated in FIG. 1, the transparent member 34 is markedly curved inwardly (upwardly as illustrated) and has a first surface 34a facing the LED 3, a second surface 34b for passage of reflected light from the document 6, and a third surface 34c contiguous to the two surfaces 34a, 34b. Both ends, 34d and 34e, of the transparent member 34 are held in close contact with the lower casing 2, with the end 34e being continual to the second surface 34b through a fourth surface 34f. The third surface 34c and the fourth surface 34f each makes an angle of about 80 degrees with the bottom surface of the lower casing 2, while the second surface 34b is far displaced from the bottom surface (the surface of document 6) out of the depth of field of a lens system 13.

The effects of this embodiment are now explained with reference to FIG. 2.

Figure 2:
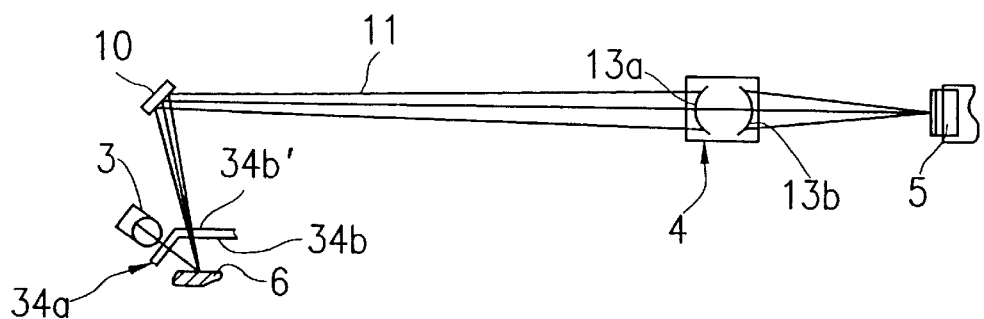
FIG. 2 is an elementary view illustrating the optical system in a conventional image scanner.

The optical system of the conventional scanner 1 is illustrated in FIG. 2. In the view, the reading light from the LED 3 passes through a surface 34a of said transparent member 34 which is substantially normal to the axis of incidence and is projected on the document 6 and the reflected light from the document 6 passes through surfaces 34b, 34b' of the transparent member 34 and is incident on the mirror 10. The reflected light from the mirror 10 passes along the light path 11 and is focused by the condenser system 4 on the PD 5.

The positions liable to pickup dust in the above optical system are the inner surface 34b' and outer surface 34b of the transparent member 34, the mirror 10, the lenses 13a, 13b of the condenser system 4, and the PD 5. The size corresponding to one picture element at the PD 5 in each of said various members may for example be as follows.

| Position | Size per picture element (mm) |
| --- | --- |
| Transparent member 34b' | 0.283 |
| Transparent member 34b | 0.245 |
| Mirror 10 | 1.07 |
| Lenses 13a, 13b | 3.98–2.62 |
| Line sensor (PD) 5 | 0.557 |

It will be apparent from the above table that the size corresponding to one sensor picture element is smallest for the transparent member 34. Therefore, dust deposited on the surface of the transparent member 34 is imaged large on the PD 5. This is because the transparent member is located close to the document (within the depth of field).

However, in the above embodiment of the invention wherein the second surface 34b of the transparent member 34 for passage of reflected light is located far away (distance L) from the document (outside of the depth of field of the lens 13), the size corresponding to one sensor picture element on this surface is very large. As a result, the dust deposited on the surface will not form a large shadow on the PD 5 so that dimming of the image on the PD 5 is prevented and, hence, accurate image reading is insured.

As also shown FIG. 1, the distance La from a surface point 6a on a document to the surface 3a of the light emitter is less than a distance Lb from the point 6a to an inner surface 34g of the transparent member which faces the optical system.

In accordance with this embodiment, dust control in the production and assembly process can be less exacting and the cost of production be as much decreased. Moreover, since the image output has no streaks due to dust, an attractive image can be insured. Furthermore, since there is no remarkable influence of dust on image density data, shading correction can be properly carried out and an image true to the original can be reproduced. In addition, the convenience in use is improved because the surface of the transparent member facing the document need not be wiped clean after each scanning.

The constructions of the respective component parts of the above embodiment are not limited to those described but may be different constructions within the scope of the invention which is only defined by the appended claim.

It should also be understood that while the present invention has been described with reference to the handy scanner 1, the same result can be obtained by applying the invention to other kinds of image scanners.

What is claimed is:

1. An image scanner comprising:
   a light-emitter for projecting light on a document,
   a light-receiver for receiving reflected light from said document to read an image thereon,
   an optical system for focusing said reflected light on said light-receiver,
   a sensor for detecting a relative amount of movement between the reading position of said light-receiver and the position of the image on said document, and
   a housing accommodating said respective sensor and receiver, wherein said housing is provided with a transparent member for guiding said reflected light to said light-receiver, said transparent member being disposed proximate to said optical system and said light-emitter and spaced apart from the surface of said document in such a manner that the distance from the surface of said document to the surface of said light-emitter is less than the distance from the surface of said document to the inner surface of said transparent member,
   wherein said transparent member has a curved portion which projects inwardly of said housing,
   said curved portion containing a surface defining said area transmitting the reflected light.

2. An image scanner as in claim 1 wherein the curved portion of the transparent member has another surface facing said light emitter for transmitting light from said light emitter to said document.

* * * * *